US006841251B2

(12) United States Patent
Desai et al.

(10) Patent No.: US 6,841,251 B2
(45) Date of Patent: Jan. 11, 2005

(54) COMPOSITION HAVING SEALING AND SOUND DAMPENING PROPERTIES AND METHODS RELATED THERETO

(75) Inventors: Umesh C. Desai, Wexford, PA (US); Marvis E. Hartman, Pittsburgh, PA (US); Anthony C. Palermo, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/772,912

(22) Filed: Feb. 5, 2004

(65) Prior Publication Data

US 2004/0157060 A1 Aug. 12, 2004

Related U.S. Application Data

(62) Division of application No. 10/078,598, filed on Feb. 19, 2002, now Pat. No. 6,749,939.

(51) Int. Cl.[7] .......................... B32B 26/38; B32B 26/36
(52) U.S. Cl. ....................... 428/413; 428/418; 428/480; 523/400; 523/440; 523/457; 524/425; 524/449; 524/451; 525/438; 106/287.22
(58) Field of Search ................................. 428/413, 418, 428/480; 523/400, 440, 457; 524/425, 449, 451; 525/438; 106/287.22

(56) References Cited

U.S. PATENT DOCUMENTS

| | | | |
|---|---|---|---|
| 3,792,850 A | 2/1974 | Krjukov et al. ................ 266/38 |
| 4,046,729 A | 9/1977 | Scriven et al. ....... 260/29.2 TN |
| 4,346,143 A | 8/1982 | Young, Jr. et al. .......... 428/332 |
| 4,681,811 A | 7/1987 | Simpson et al. ............ 428/413 |
| 4,739,019 A | 4/1988 | Schappert et al. .......... 525/438 |
| 4,883,717 A | * 11/1989 | Kitamura et al. ........... 428/458 |
| 5,034,556 A | 7/1991 | Kahle, II .................... 558/155 |
| 5,084,541 A | 1/1992 | Jacobs, III et al. ........... 528/45 |
| 5,294,265 A | 3/1994 | Gray et al. ................. 148/250 |
| 5,306,526 A | 4/1994 | Gray et al. ................. 427/309 |
| 5,580,371 A | 12/1996 | Falberg ................... 106/14.12 |
| 5,584,946 A | 12/1996 | Karmaschek et al. ....... 148/247 |
| 5,652,024 A | 7/1997 | Sanborn et al. .......... 427/383.7 |
| 5,653,823 A | 8/1997 | McMillen et al. .......... 148/247 |
| 5,733,962 A | 3/1998 | Osako et al. ............... 524/449 |
| 6,153,709 A | 11/2000 | Xiao et al. ................. 525/528 |
| 6,180,726 B1 | * 1/2001 | Eklund et al. ............. 525/408 |
| 6,277,903 B1 | 8/2001 | Sophiea et al. ............ 523/428 |
| 6,420,458 B1 | 7/2002 | Surjan et al. .............. 523/443 |
| 6,482,536 B1 | * 11/2002 | Tanaka et al. ............. 428/626 |
| 6,521,706 B1 | 2/2003 | Desai et al. ................ 525/111 |
| 6,531,524 B2 | 3/2003 | Ring et al. ................. 523/205 |

FOREIGN PATENT DOCUMENTS

| | | | |
|---|---|---|---|
| GB | 2237812 | 5/1991 | |
| JP | 56047446 A | * 4/1981 | .......... C08L/67/02 |
| JP | 60069174 | 4/1985 | |
| WO | WO99/16840 | 4/1999 | |

* cited by examiner

*Primary Examiner*—Margaret G. Moore
*Assistant Examiner*—Marc S. Zimmer
(74) *Attorney, Agent, or Firm*—Jacques B. Miles; William J. Uhl

(57) ABSTRACT

A composition having sealing and sound dampening properties is disclosed which comprises one or more polyepoxides comprising at least two epoxide groups per molecule; a thermoplastic polyester polymer; a curing agent adapted to react with the polyepoxides; inorganic particles having an oil absorption value of less than 70; and inorganic microparticles different from the previously mentioned inorganic particles, the inorganic microparticles having an average particle size prior to incorporation into the composition ranging from 0.5 to 200 microns. Multilayer composites, coated substrates, and methods for forming sound dampening coatings on a metallic substrate are also provided.

2 Claims, No Drawings

COMPOSITION HAVING SEALING AND SOUND DAMPENING PROPERTIES AND METHODS RELATED THERETO

This is a division of application Ser. No. 10/078,598 filed Feb. 19, 2002, now U.S. Pat. No. 6,749,939.

FIELD OF THE INVENTION

The present invention relates to compositions having sealing and sound dampening properties and related processes. In particular, the present invention relates to compositions having sealing and sound dampening properties that can be applied in a body shop via spraying.

BACKGROUND & DISCUSSION

Sealants and sound dampeners typically are applied to a variety of areas in automobile bodies such as interior floor pans, firewalls, decklids, and between the inner and outer panels of doors. Conventionally, sealants have comprised plastisols that can be applied between and upon metal seams, welds and within hollow cavities of autobodies. Generally, sealants are used to impart structural integrity and to create a barrier against dirt and exhaust gases. Sound dampeners typically are pre-cut pieces of fibrous asphaltic material or aluminum constrained butylene rubber used to dampen road and engine noise that can be transmitted through the autobody substrates.

A sprayable coating composition having vibration and harsh noise reduction or absorption properties is disclosed in International Application WO 99/16840. The sprayable coating composition comprises a mixture of flexible epoxy resins and rigid epoxy resins. The flexible epoxy resins are defined as those having elastomeric chains in the backbone; and the rigid epoxy resins are defined as those epoxy resins having bisphenol moieties in the backbone. The mixture of the flexible and rigid epoxy resins should be such that the peak glass transition temperature of the composition is 10° C. or greater.

Conventionally, sealants and sound dampeners are applied to some automotive parts in the paint shop area of an automobile assembly plant which is typically located downstream from the electrocoat tank in the automotive coating process. The application of sealants and sound dampeners in the paint shop area can result in fingerprints, dirt and/or overspray on the automotive part which must be removed prior to subsequent application of primer and/or top coatings.

The body shop is the area of an automobile assembly plant which is located upstream from and can include the electrocoat tank. In a body shop, any dirt, fingerprints, and/or overspray on the automotive part resulting from the application of sealants and sound dampeners could be washed away in the pretreatment wash cycle. It, therefore, would be advantageous to provide a composition having sealing and sound dampening properties suitable for application in the body shop area of the automotive assembly plants.

SUMMARY OF THE INVENTION

In one embodiment, the present invention provides a composition having improved sealing and sound dampening properties comprising:
(a) one or more polyepoxides comprising at least two epoxide groups per molecule;
(b) a thermoplastic polyester polymer;
(c) a curing agent adapted to react with the polyepoxides;
(d) inorganic particles having an oil absorption value of less than 70 as determined in accordance with ASTM D 281-95; and
(e) inorganic microparticles different from the inorganic particles (d), the inorganic microparticles having an average particle size prior to incorporation into the composition ranging from 0.5 to 200 microns.

In another embodiment, the present invention provides a multilayer composite comprising a weldable primer layer formed from a weldable primer composition, and a second layer having improved sealing and sound dampening properties formed from a second composition over at least a portion of the weldable primer layer, the second composition comprising:
(a) one or more polyepoxides comprising at least two epoxide groups per molecule;
(b) a thermoplastic polyester polymer;
(c) a curing agent adapted to react with the polyepoxide (a);
(d) inorganic particles having an oil absorption value of less than 70 as determined in accordance with ASTM D 281-95; and
(e) inorganic microparticles different from the inorganic particles (d), the inorganic microparticles having an average particle size prior to incorporation into the composition ranging from 0.5 to 200 microns.

In yet another embodiment, the invention provides a coated metallic substrate comprising:
a metallic substrate, and a composition having sealing and sound dampening properties over at least a portion of the substrate, said composition comprising:
(a) one or more polyepoxides comprising at least two epoxide groups per molecule;
(b) a thermoplastic polyester polymer;
(c) a curing agent adapted to react with the polyepoxides (a);
(d) inorganic particles having an oil absorption value of less than 70 as determined in accordance with ASTM D 281-95; and
(e) inorganic microparticles different from the inorganic particles (d), the inorganic microparticles having an average particle size prior to incorporation into the composition ranging from 0.5 to 200 microns.

Additionally, the present invention provides a coated metallic substrate comprising:
a metallic substrate;
a weldable primer layer formed from a weldable primer composition deposited over at least a portion of the substrate; and
a second layer formed from a second composition having sealing and sound dampening properties deposited over at least a portion of the weldable primer layer, the second composition comprising:
(a) one or more polyepoxides comprising at least two epoxide groups per molecule;
(b) a thermoplastic polyester polymer;
(c) a curing agent adapted to react with the polyepoxides (a);
(d) inorganic particles having an oil absorption of less than 70; and
(e) inorganic microparticles different from the inorganic particles (d), the inorganic microparticles having an average particle size prior to incorporation into the composition ranging from 0.5 to 200 microns.

In another embodiment, the invention provides a method for forming a coating having sealing and sound dampening properties on a metallic substrate comprising the steps of:

(a) providing a metallic substrate having two major surfaces, (b) applying a composition to at least a portion of one of the major surfaces of the substrate, said composition comprising:
  (1) one or more polyepoxides comprising at least two epoxide groups per molecule;
  (2) a thermoplastic polyester polymer;
  (3) a curing agent adapted to react with the polyepoxides (1);
  (4) inorganic particles having an oil absorption value of less than 70 as determined in accordance with ASTM D 281-95; and
  (5) inorganic microparticles different from the inorganic particles (4), the inorganic microparticles having an average particle size prior to incorporation into the composition ranging from 0.5 to 200 microns; and (c) curing the applied composition, wherein the coated substrate of step (c) has a sound dampening value greater than 0.030 Oberst dissipation factor as measured at 200 Hz at 25° C. in accordance with ASTM E-756-98.

In yet another embodiment, the invention provides a composition having sealing and sound dampening properties comprising:

(a) one or more polyepoxides comprising at least two epoxide groups;

(b) a thermoplastic polyester polymer;

(c) a curing agent adapted to react with the polyepoxide (a); and (d) inorganic particles having an oil absorption value of less than 70 as determined in accordance with ASTM D 281-95, the improvement comprising the inclusion in the composition of inorganic microparticles different from the inorganic particles (d) in an amount sufficient to provide corrosion resistance properties as measured in accordance with Chrysler Test Method LP-463PB-10-01 which are superior to the corrosion resistance properties of the same composition which does not contain said inorganic microparticles, the inorganic microparticles having an average particle size prior to incorporation into the composition ranging from 0.5 to 200 microns.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

The present invention is directed to a composition having sealing and sound dampening properties. The composition comprises one or more polyepoxides comprising two or more epoxide groups per molecule, a thermoplastic polyester polymer, a curing agent adapted to react with the previously mentioned polyepoxide, inorganic particles having an oil absorption value of less than 70, and inorganic microparticles different from the previously mentioned inorganic particles, the inorganic microparticles having an average particle size prior to incorporation into the composition ranging from 0.5 to 200 microns.

The one or more polyepoxides comprise two or more epoxide groups per molecule. As used herein, the term "polyepoxide" refers to any epoxide group-containing compound having two or more epoxide groups per molecule. The polyepoxides in the present invention can be saturated or unsaturated, cyclic or acyclic, aliphatic, alicyclic, aromatic or heterocyclic and can comprise substituents such as halogen, hydroxyl and ether groups. Polyepoxides containing the aforementioned substituent groups can be obtained via well known methods.

Several types of polyepoxides can be used in the present invention for example, polyglycidyl ethers of polyhydric alcohols, polyglycidyl esters of polycarboxylic acids, inter alia, can be employed. Epoxy polyethers can be obtained by reacting an epihalohydrin, such as epichlorohydrin or epibromohydrin, with a polyphenol in the presence of an alkali. Suitable polyphenols include resorcinol, catechol, hydroquinone, bis(4-hydroxyphenyl)-2,2-propane also known as bisphenol A, bis(4-hydroxyphenyl)-1,1-isobutane, 4,4-dihydroxybenzophenone, bis(4-hydroxyphenol)-1,1-ethane, bis(2-hydroxyphenyl)-methane, and 1,5-hydroxynaphthalene, and the diglycidyl ether of bisphenol A.

Suitable polyhydric alcohols are ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Suitable polyglycidyl esters of a polycarboxylic acids can be produced by the reaction of epichlorohydrin or similar epoxy compound with an aliphatic or aromatic polycarboxylic acid such as oxalic acid, succinic acid, glutaric acid, terephthalic acid, 2,6-naphthalene dicarboxylic acid, and dimerized linoleic acid.

Also suitable are the polyepoxides derived by epoxidating an olefinically unsaturated alicyclic compound. Oxygen and selected metal catalysts, perbenzoic acid, acid-aldehyde monoperacetate, or peracetic acid can be used for the epoxidation. Examples of these polyepoxides include epoxy alicyclic ethers and esters which are well known in the art.

Polyepoxides which contain oxyalkylene groups in the epoxy molecule are also suitable for use in the present invention. The oxyalkylene groups can be pendant to the main molecular chain of the polyepoxide or part of the main chain itself, and have the general formula: —O—R, where R is alkyl and pendant or links the ether oxygen with the rest of the chain. The chain length of the oxyalkylene group, the nature of the epoxy, and the degree of water solubility desired determines the proportion of oxyalkylene groups in the polyepoxide.

Also suitable are the epoxy novolac resins obtained by reacting an epihalohydrin with the condensation product of aldehyde and monohydric or polyhydric phenols. For example, an epoxy novolac resin can be formed from the reaction of epichlorohydrin and phenol-formaldehyde condensate. Mixtures of polyepoxides can be used as well.

The polyepoxide (a) can be present in the composition of the present invention in an amount ranging from 15 to 50 weight percent, usually 20 to 50 weight percent, and typically 25 to 45 weight percent, based on the total weight of the composition. Generally, the epoxide equivalent weight can range from 70 to 4,000.

The composition of the present invention also includes a thermoplastic polyester polymer (b). The term "polyester" as used herein with respect to the thermoplastic polyester polymer is intended to include resins which contain oil or fatty acid modifications, for example, alkyd resins. Suitable thermoplastic polyester polymers typically contain no more than 10 percent by weight of aromatic units, the percentage based upon the total weight of all of the ingredients used to prepare the polyester. As used herein, an "aromatic unit" is intended to mean one or more aromatic rings such as those generally derived from aromatic acids or anhydrides, for example, phthalic acid, isophthalic acid or terephthalic acid.

The thermoplastic polyester polymer usually is insoluble in the previously mentioned polyepoxide (a). In other words, when the thermoplastic polyester polymer is mixed with the polyepoxide, a hazy, heterogeneous phase will result. The term "thermoplastic" connotes that the polyester is substantially non-reactive with the other components present in the composition.

In a particular embodiment of the present invention, the thermoplastic polyester polymer is substantially saturated. The saturated polyesters can contain some percentage of unsaturated units provided that the thermoplastic polyester is not reactive with the other components of the curable sound dampening composition. For example, the saturated thermoplastic polyester may contain 10 percent or less of unsaturated units by weight, the percentage being based on the total weight of all the ingredients used to prepare the thermoplastic polyester.

Suitable thermoplastic polyesters can be prepared from polyfunctional acids and polyhydric alcohols by methods well known in the art. Non-limiting examples of suitable polyfunctional acids include adipic acid, azelaic acid, glutaric acid, phthalic acid, sebacic acid and the anhydrides thereof. Unsaturated polyfunctional acids such as maleic acid and fumaric acid can be used to introduce unsaturation if desired. Suitable non-limiting examples of polyhydric alcohols include ethylene glycol, propylene glycol, diethylene glycol, dipropylene glycol, butylene glycol, glycerol, trimethylolpropane, pentaerythritol and sorbitol.

Generally, when the thermoplastic polyester is prepared from the compounds described above, one or more of the diols and one or more of the diacids is charged into a reaction vessel. The reaction vessel is heated to a temperature ranging from about 200° C. to 300° C., and excess water is removed via distillation. Solvents such as xylene or toluene can be employed in the reaction mixture to help remove water by azeotropic distillation. An esterification catalyst such as dibutyltin oxide or butyl stannoic acid can be used to increase the rate of reaction. Similarly, functional derivatives of the diacids such as esters anhydrides or acid chlorides can be employed.

The thermoplastic polyester polymer can be present in the inventive composition in an amount ranging from 3 to 30 weight percent, often from 5 to 25 weight percent, and typically from 7 to 20 weight percent, based on the total formula weight of the composition. Additionally, the thermoplastic polyester polymer can have a weight average molecular weight of less than 10,000, and typically from 400 to 8,000 as determined by gel permeation chromatography (GPC) using a differential refractometer. The number average molecular weight of the thermoplastic polyester polymer can range from 400 to 5,000.

The composition of the present invention having sealing and sound dampening properties further comprises a curing agent (c) capable of reacting with the previously mentioned polyepoxides. Suitable curing agents include, for example, aliphatic, cycloaliphatic and aromatic polyfunctional amines and polyamides.

Examples of suitable amines include ethylene diamine, diethylene triamine, triethylene tetraamine, tetraethylene pentamine, 1,4-diaminobutane; 1,3-diaminobutane, hexamethylene diamine, 3-(N-isopropylamino) propylamine, diaminocyclohexane, and polyoxypropyleneamines. Aromatic amines can also be used in the present invention. Examples of suitable aromatic amines include metaphenylene diamine, p, p'-methylene dianiline, and 1,4-aminonaphthalene. Latent curing agents, i.e., those which are inactive until activated by the application of heat, can also be used. Examples of latent curing agents include boron trifluoride monoethylamine complex, boron trifluoride diethylamine complex, boron trifluoride triethylamine complex, boron trifluoride pyridine complex, boron trifluoride benzyldimethylamine complex, boron trifluoride benzylamine, boron trifluoride etherate, and dicyandiamide.

Suitable polyamide curing agents include those derived from fatty acids, dimerized fatty acids, polymeric fatty acids and, aliphatic polyamines. Examples of suitable polyamide curing agents are VERSAMID® 220 and 125 available from Cognis Corporation.

The curing agent (c) can be present in the composition of the present invention in an amount ranging from 1 to 50 percent by weight, often from 3 to 15 percent by weight, and typically from 0.5 to 5 percent by weight, based on the total weight of the composition.

The composition of the present invention having sealing and sound dampening properties also comprises inorganic particles (d). The inorganic particles can have an oil absorption value of less than or equal to 70, and typically less than or equal to 60. For purposes of the present invention, the "oil absorption value" of the inorganic particles should be understood as that determined in accordance with ASTM D 281-95, Standard Test Method for Oil Absorption of Pigment by Spatula Rub-Out.

The inorganic particles can include inorganic materials such as mica, calcium carbonate, dolomite, talc, and calcium metasilicate, for example, wollastonite. The inorganic particles can have a variety of morphologies, including a spherical morphology, an irregular morphology, a platy morphology, a needle shaped morphology, or mixtures thereof. Also, the inorganic particles can have a particle size prior to incorporation into the composition ranging from 5 to 200 microns, and typically from 20 to 80 microns.

The inorganic particles (d) can be present in the composition of the present invention in an amount ranging from 5 to 65 weight percent, often from 15 to 50 weight percent, and typically from 20 to 40 weight percent, based on the total weight of the composition.

The composition of the present invention having sealing and sound dampening properties comprises inorganic microparticles (e) which are different from and in addition to the inorganic particles described above. Suitable inorganic microparticles include colloidal silica, calcium modified precipitated silica, ion exchanged silica gel, colloidal alumina, and mixtures thereof. Prior to incorporation into the composition, the average particle size of such inorganic microparticles can range from 0.5 to 200 microns, usually from 3 to 150 microns, and typically from 10 to 100 microns. The inorganic microparticles can be present in the composition of the present invention in an amount ranging from 0.1 to 5 weight percent, and typically from 0.5 to 3 weight percent based on the total weight of the composition.

A variety of optional ingredients also can be included in the composition of the present invention. For example, the present invention can include pigments, reinforcement materials, thixotropes, plasticizers, extenders, stabilizers, antioxidants, at least one polyglycidyl ester of a polycarboxylic acid different from the polyepoxide (a), at least one alkylene diene copolymer, and one or more metallic compounds.

In one embodiment of the present invention, the composition of the present invention having sealing and sound dampening properties further comprises a polyglycidyl ester of a polycarboxylic acid different from the polyepoxide (a). An example of a polyglycidyl ester of a polycarboxylic acid is the reaction product of an epihalohydrin and a dimerized fatty acid such as the reaction product of epichlorohydrin and dimerized linoleic acid. The polyglycidyl ester can be present in the composition in an amount of up to 20 weight percent, and typically from 2 to 16 weight percent, based on the total weight of the composition.

The composition of the present invention having sealing and sound dampening properties optionally can comprise an alkylene diene copolymer, for example, an ethylene propylene diene terpolymer. The weight average molecular weight of suitable alkylene diene copolymers can range from 1,000 to 15,000, and typically from 3,000 to 10,000 as determined by GPC using a polystyrene standard. The number average molecular weight of the alkylene diene copolymer can range from 6,000 to 7,000. When used, the alkylene diene copolymer can be present in the composition of the present invention in an amount of up to 10 weight percent, and typically from 1 to 7 weight percent based on the total weight of the composition.

In one particular embodiment of the present invention, the composition of the present invention comprises one or more metallic compounds. The metallic compound(s) suitable for use in the present invention comprise a metal cation and a counterion, i.e., an anion. Suitable metal cations include those selected from zinc, aluminum, magnesium, calcium, strontium, titanium, zirconium, cesium, and yttrium. Suitable anions include those selected from phosphates, polyphosphates, phosphites, molybdates, sulfonates, tungstates, borates, borosilicates, silicates, and cyanamides. In one embodiment of the present invention, the metal compound is selected from a zinc compound, a calcium compound, and mixtures thereof. The metallic compound(s) can be present in the inventive composition in an amount ranging from 0.1 to 5 weight percent, often from 0.3 to 4 weight percent, and typically from 0.5 to 3 weight percent based on the total weight of the composition.

Often times, the composition of the present invention will be applied to a metallic substrate. As used herein, "substrate" refers to a bare (i.e., uncoated or untreated) substrate, to a treated substrate, or, alternatively, to a previously coated substrate. Also the "substrate" can include a metal substrate which has been previously treated and/or coated with a combination of pretreatments, conversion coatings and/or primer coatings. Metallic substrates used in the present invention encompass a number of metallic substrates known in the art, including, ferrous metals, non-ferrous metals and combinations thereof. Suitable ferrous metals include iron, steel, and alloys thereof. Nonlimiting examples of useful steel materials include cold rolled steel, galvanized (zinc coated) steel, electrogalvanized steel, stainless steel, pickled steel, zinc-iron alloy such as GALVANNEAL, GALVALUME and GALFAN zinc-aluminum alloys, and combinations thereof. Useful non-ferrous metals include aluminum, zinc, magnesium and alloys thereof. Combinations or composites of ferrous and non-ferrous metals can also be used.

The composition of the present invention having sealing and sound dampening properties can be applied to a metallic substrate using any of a variety of application methods known in the art. For example, the composition can be applied to a metallic substrate via spray and extrusion techniques.

The application viscosity of the sealing and sound dampening compositions of the present invention can be less than 120 seconds, and typically less than 100 seconds, for 20 grams of the composition extruded by a Caster-Sievers rheometer (having a 0.125 inch diameter and a 2 inch long orifice) at 40 psi, and a composition temperature after extrusion of 77° F. (25° C.).

After application as described above, the composition of the present invention is cured. The inventive composition can be cured at ambient temperature, a combination of ambient and thermal curing conditions, or at thermal conditions only. Specific curing times and temperatures depend on the application conditions and the nature of the curing agent(s). For example, in a "real life" application, the composition of the present invention can be cured in electrocoat and/or top coat curing ovens in an automotive assembly plant.

The cured composition can have a sound dampening value greater than 0.030, typically greater than 0.080 Oberst dissipation factor. For purposes of the present invention, Oberst dissipation factor is measured at 200 Hz and 25° C. in accordance with ASTM E-756-98.

As previously mentioned, one of the major benefits of the composition of the present invention is that it can be applied in a body shop area of an automotive assembly plant. By applying the composition in the body shop, any dirt, fingerprints, and/or overspray on an automotive part can be washed away in the pretreatment wash cycle.

Depending on the end use of the automotive part onto which the composition of the present invention is applied, it may be desirable to enhance the corrosion resistance of a metallic substrate prior to application of the composition.

In one embodiment of the present invention, the corrosion resistance can be enhanced by applying the composition of the present invention over a layer of weldable primer, which has previously been applied to the substrate. Weldable primers are well known in the art for providing corrosion resistance. Nonlimiting examples of weldable primers are those disclosed in U.S. Pat. Nos. 5,580,371; 5,652,024; 5,584,946; 3,792,850, and GB Patent No. 2,237,812A.

In one particular embodiment of the present invention, the weldable primer layer can be formed from a weldable primer composition comprising (A) a resinous binder comprising (1) at least one functional group containing polymer, and (2) at least one curing agent having functional groups that are reactive with the functional groups of the functional group containing polymer (1); and (B) at least one electroconductive pigment dispersed in the resinous binder (A). The weldable primer typically is formed from a thermoset composition which is weldable when deposited and cured on a metallic substrate.

In the aforementioned weldable primer composition, the polymer (1) can comprise functional groups which include but are not limited to hydroxyl, amine, carbamate, carboxyl, epoxy, and urea groups. Typically, the functional group-containing polymer comprises one or more epoxy group-containing polymers and/or one or more phosphatized epoxy group-containing polymers.

Useful epoxy group-containing polymers have at least one epoxy or oxirane group in the molecule, such as polyglycidyl ethers of polyhydric alcohols. Useful polyglycidyl ethers of polyhydric alcohols can be formed by reacting epihalohydrins such as epibromohydrin, dichlorohydrin and epichlorohydrin with polyhydric alcohols, such as dihydric alcohols, in the presence of an alkali condensation and dehydrohalogenation catalyst. Suitable alkali condensation and dehydrohalogenation catalyst include sodium hydroxide or potassium hydroxide.

Suitable polyhydric alcohols can be aromatic, aliphatic or cycloaliphatic alcohols. Nonlimiting examples of suitable aromatic polyhydric alcohols include phenols that are preferably at least dihydric phenols. Other useful aromatic polyhydric alcohols include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane, i.e., bisphenol A.

Nonlimiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

The epoxy group-containing polymer typically has at least two epoxy groups per molecule and aromatic or cycloaliphatic functionality which can improve adhesion to a metal substrate. Further, the epoxy group-containing polymer can have a number average molecular weight ("Mn") ranging from 220 to 25,000, as determined by gel permeation chromatography using a polystyrene standard.

Useful epoxy group-containing polymers can include those disclosed in U.S. Pat. Nos. 5,294,265; 5,306,526 and 5,653,823, which are hereby incorporated by reference. Other useful epoxy group-containing materials can include epoxy-functional acrylic polymers, glycidyl esters of carboxylic acids and mixtures thereof. Examples of suitable commercially available epoxy group-containing polymers can include those which are available from Shell Chemical Company under the tradename EPON® (e.g., EPON® 836, EPON® 828, EPON® 1002F and EPON® 1004F).

Phosphatized group-containing polymers typically comprise a reaction product of an epoxy group-containing polymer with a compound containing phosphorus acid groups. Usually, the resulting reaction product comprises reactive functional groups.

The compound containing phosphorus acid groups which is reacted with the epoxy group-containing polymer can comprise phosphonic acids, phosphorous acid, phosphoric acids (which are typically employed) including super- and poly-, and mixtures thereof.

Examples of suitable phosphonic acids include those having at least one group of the structure:

where R is —C—, usually $CH_2$, and typically O—CO—$(CH_2)_2$—. Nonlimiting examples of suitable phosphonic acids include 1-hydroxyethylidene-1,1-diphosphonic acid, methylene phosphonic acids, and alpha-aminomethylene phosphonic acids containing at least one group of the structure:

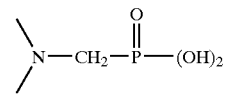

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

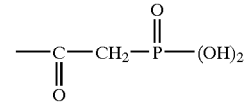

Nonlimiting examples of suitable phosphonic acids can include benzylaminobis(methylene phosphonic) acid, cocoaminobis(methylene phosphonic) acid, triethylsilylpropylamino(methylene phosphonic) acid and carboxyethyl phosphonic acid.

The equivalent ratio of the compound containing phosphorus acid groups to epoxy group-containing polymer can be within the range of 0.3 to 5.0:1, usually 0.5 to 3.5:1. The epoxy group-containing polymer and the compound-containing phosphorus acid groups can be reacted together by any method known to those skilled in the art.

The functional groups associated with the reaction product of the epoxy group-containing polymer and the compound-containing phosphorus acid groups are hydroxyl groups including acidic hydroxyls or hydroxyl groups and epoxy groups depending on the equivalent ratio of the compound containing phosphorus acid groups to epoxy group-containing polymer.

The resinous binder of the weldable primer further comprises (2) a curing agent having functional groups that are reactive with the functional groups of the polymer (1) described above. The curing agent (2) can be selected from at least one of aminoplasts, polyisocyanates, including blocked isocyanates, polyacids, organometallic acid-functional materials, polyamines, polyamides and mixtures of any of the foregoing depending on the identity of the functional groups of the polymer (1).

Useful aminoplasts can be obtained from the condensation reaction of formaldehyde with an amine or amide. Nonlimiting examples of suitable amines or amides include melamine, urea and benzoguanamine.

Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the tradename CYMEL® and from Solutia, Inc. under the trademark RESIMENE®. Specific examples of suitable aminoplasts include CYMEL® 385 (for water-based compositions), CYMEL® 1158 imino-functional melamine formaldehyde condensates, and CYMEL® 303.

Other curing agents suitable for use in the weldable primer include polyisocyanate curing agents. As used herein, the term "polyisocyanate" is intended to include blocked (or capped) polyisocyanates as well as unblocked polyisocyanates. The polyisocyanate can be aliphatic, aromatic, or a mixture of the foregoing. Although higher polyisocyanates such as isocyanurates of diisocyanates are often used, diisocyanates can be used. Higher polyisocyanates also can be used in combination with diisocyanates. Isocyanate prepolymers, for example reaction products of polyisocyanates with polyols can also be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Suitable capping agents include oximes and lactams.

Other useful curing agents comprise blocked polyisocyanate compounds such as, for example, the tricarbamoyl triazine compounds described in detail in U.S. Pat. No. 5,084,541, which is incorporated herein by reference.

Suitable curing agents are described in U.S. Pat. No. 4,346,143 at column 5, lines 45–62 and include blocked or unblocked di- or polyisocyanates such as toluene diisocyanate blocked with caprolactam. A toluene diisocyanate blocked with caprolactam is commercially available from Bayer Corporation as DESMODUR® BL 1265.

Suitable polyacid curing agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Other suitable curing agents include organometallic complexed materials, for example, stabilized ammonium zirconium carbonate solution commercially available from Magnesium Elektron, Inc. as BACOTE™ 20, stabilized ammonium, zirconium carbonate, and a zinc-based polymer crosslinking agent commercially available from Ultra Additives Inc. as ZINPLEX 15.

Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. These and other suitable polyamines are described in detail in U.S. Pat. No. 4,046,729 at column 6, line 61 to column 7, line 26, which is incorporated herein by reference.

Appropriate mixtures of curing agents may also be used in the weldable primer. The weight percent of the curing agent present in the weldable primer generally ranges from 5 to 60 percent based on the total weight of resin solids present in the resinous binder.

The resinous binder of the weldable primer composition may further comprise a catalyst to accelerate the crosslinking reaction or to promote the crosslinking reaction at a lower temperature. Selection of suitable catalysts is dependent upon the particular functional groups present and are well known to those skilled in the art. Nonlimiting examples of suitable catalysts for aminoplast reactions include acidic materials, for example, acid phosphates, such as phenyl acid phosphate, and substituted or unsubstituted sulfonic acids such as dodecylbenzene sulfonic acid and para-toluene sulfonic acid. Nonlimiting examples of suitable catalysts for reactions between isocyanate groups and active hydrogen-containing materials, for example, those comprising hydroxyl groups, include tin catalysts such as dibutyl tin dilaurate, dibutyl tin diacetate, and dibutyl tin oxide. Nonlimiting examples of epoxy acid base catalysts include tertiary amines such as N,N'-dimethyldodecyl amine catalysts.

The catalyst can also be a phosphatized polyester or a phosphatized epoxy. For example, the catalyst can be the reaction product of phosphoric acid and a bisphenol A diglycidyl ether having two hydrogenated phenolic rings, such as DRH-151, which is commercially available from Shell Chemical Co. When added to the other components that form the weldable primer, the catalyst can be present in an amount ranging from 0.1 to 5.0 percent by weight, and is typically present in an amount ranging from 0.5 to 1.5 percent by weight based on the total weight of resin solids present in the weldable primer.

As stated above, the weldable primer further comprises (B) at least one electroconductive pigment to render the composition electrically conductive and spot-weldable. Suitable electroconductive pigments include electrically conductive carbon black pigments. Generally, the carbon blacks can be any one or a blend of carbon blacks ranging from those that are known as higher conductive carbon blacks, i.e. those with a BET surface area greater than 500 $m^2$/gram and DBP adsorption number (determined in accordance with ASTM D2414-93) of 200 to 600 ml/100 grams to those with lower DBP numbers on the order of 30 to 120 ml/100 gram such as those with DBP numbers of 40 to 80 ml/100 grams.

Examples of commercially available electroconductive carbon black pigments include Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation, Pigments Group. Suitable carbon blacks are also described in U.S. Pat. No. 5,733,962.

Also, electrically conductive silica pigments may be used. Suitable examples include AEROSIL 200 sold by Japan Aerosil Co., Ltd., and SYLOID® 161, SYLOID® 244, SYLOID® 308, SYLOID® 404 and SYLOID® 978, all available from Fuji Davison Co., Ltd.

Other electrically conductive pigments can be used. For example, metal powders such as aluminum, copper or special steel, molybdenum disulphide, iron oxide, e.g., black iron oxide, antimony-doped titanium dioxide and nickel doped titanium dioxide can be used.

Particles coated with metals such as cobalt, copper, nickel, iron, tin, zinc, and combinations of thereof are also useful. Particles which can be coated with the aforementioned metals include alumina, aluminum, aromatic polyester, boron nitride, chromium, graphite, iron, molybdenum, neodymium/iron/boron, samarium cobalt, silicon carbide, stainless steel, titanium diboride, tungsten, tungsten carbide, and zirconia particles. The aforementioned metal-coated particles are commercially available from Advanced Ceramics Corp.

Other metal-coated particles which may be used advantageously in the weldable primer include ceramic microballoons, chopped glass fibers, graphite powder and flake, boron nitride, mica flake, copper powder and flake, nickel powder and flake, aluminum coated with metals such as carbon, copper, nickel, palladium, silicon, silver and titanium coatings. These particles are typically metal-coated using fluidized bed chemical vacuum deposition techniques. Such metal-coated particles are commercially available from Powdermet, Inc. Mixtures of different electroconductive pigments can be used.

The electroconductive pigment also can be selected from at least one of ferrophosphorous, zinc, tungsten and mixtures thereof. The electroconductive pigment typically is dispersed in the resinous binder such that the weight ratio of electroconductive pigment to resinous binder is within the range of 1.0 to 6.0:1. Zinc and ferrophosphorous can also be used either alone or in combination as the electroconductive pigment.

When tungsten is used as the electroconductive pigment, the tungsten is dispersed in the resinous binder such that the weight ratio of electroconductive pigment to resinous binder is within the range of 0.1 to 4.0:1, typically within the range of 0.75 to 1.25:1. Higher levels of tungsten can be used if desired.

Suitable zinc pigments are commercially available from ZINCOLI GmbH as trademark ZINCOLIS® 620 or 520. Suitable iron phosphide pigments, also referred to as ferrophosphorus, are commercially available from Occidental Chemical Corporation under the tradename FERROPHOS™.

The electroconductive pigment is dispersed in the resinous binder in an amount such that when the weldable primer is deposited and cured on a metallic substrate, the weldable primer is sufficiently electroconductive to sustain a spot welding and joining operation as used in an automotive assembly plant. Typically, the weight ratio of the electroconductive pigment to the resinous binder is within the range of 0.2 to 10, and often within the range of 1.0 to 6.0:1.

The weldable primer may further comprise one or more corrosion inhibitive materials, for example, corrosion resistant pigments. Suitable corrosion resistant pigments include, but are not limited to, zinc phosphate, calcium ion-exchanged silica, colloidal silica, synthetic amorphous silica, and molybdates such as calcium molybdate, zinc molybdate, barium molybdate, strontium molybdate, and mixtures thereof. Suitable calcium ion-exchanged silica is commercially available from W. R. Grace & Co. as SHIELDEX® AC3. Suitable colloidal silica is available from Nissan Chemical Industries, Ltd. under the tradename SNOWTEX®. Suitable amorphous silica is available from W.R. Grace & Co. under the tradename SYLOID®.

The weldable primer can further comprise other optional ingredients such as inorganic lubricants, for example, molybdenum disulfide particles which are commercially available from Climax Molybdenum Marketing Corporation. The weldable primer can also include extender pigments such as iron oxides and iron phosphides, flow control agents, and thixotropic agents such as silica, montmorillonite clay, and hydrogenated castor oil. Further, the weldable primer can include anti-settling agents such as aluminum stearate and polyethylene powder, dehydrating agents which inhibit gas formation, such as silica, lime or sodium aluminum silicate, and wetting agents including salts of sulfated castor oil derivatives such as those commercially available from Cognis Corporation under the trademark RILANIT® R4.

Generally, the weldable primer is essentially free of chromium-containing materials, i.e., contains less than 2 weight percent of chromium-containing materials (expressed as $CrO_3$), often less than 0.05 weight percent, and typically about 0.00001 weight percent based on the weight of total solids present in the composition. Examples of such chromium-containing materials include chromic acid, chromium trioxide, chromic acid anhydride, dichromate salts such as ammonium dichromate, sodium dichromate, potassium dichromate, and calcium chromate.

The weldable primer may contain a diluent to adjust the viscosity of the coating composition. Useful diluents include water, organic solvents, or mixtures of water and organic solvents. If a diluent is used, it should not detrimentally affect the adhesion of the curable coating composition to the metal substrate.

When water is used as the diluent ("aqueous weldable primer"), it may be necessary to include additives such as dispersants, thickeners, stabilizers, rheology modifiers, and anti-settling agents in the weldable primer. A suitable rheology modifier is RM-8 which is commercially available from Rohm and Haas Company. A suitable dispersing agent and/or stabilizer is potassium tripolyphosphate (KTPP).

Typically, an aqueous weldable primer has a viscosity ranging from 100 to 2000 centipoise as determined using a Brookfield Cone and Plate viscometer. Depending on the application method which will be used to apply the weldable primer, it may be necessary to further reduce the viscosity of the weldable primer by adding more water and/or organic solvent.

Aqueous weldable primer compositions can also contain an amine. For example, hydroxyl group-containing amines such as dimethanolamne and diisopropanolamine are suitable. The volatile organic compound (VOC) content of the aqueous composition can be less than 2; typically, it is less than 1.7.

Optionally, the aqueous weldable primers can comprise one or more surfactants to improve the ability of the coating to wet the substrate (i.e., to form a continuous coating thereover). Generally, surfactants are present in an amount of less than 2 weight percent based on total weight of the coating composition. Suitable surfactants are commercially available from Air Products and Chemicals, Inc. under the tradename SURFYNOL®).

The diluent can be an organic solvent ("organic solvent-based weldable primer"). For example, alcohols having up to about 8 carbon atoms, such as ethanol and isopropanol; alkyl ethers of glycols, such as 1-methoxy-2-propanol, and monoalkyl ethers of ethylene glycol, diethylene glycol and propylene glycol are suitable diluents. A propylene glycol monomethyl ether or a dipropylene glycol monomethyl ether such as those commercially available from Dow Chemical Company as DOWANOL® PM and DOWANOL® DPM, respectively, are well known diluents.

Organic solvent-based weldable primers generally have a viscosity ranging from 100 to 2000 centipoise as determined using a Brookfield Cone and Plate viscometer. If necessary, the viscosity of the weldable primer may be further reduced using a suitable organic diluent.

The organic solvent-based weldable primer can further include an amine for stability purposes. For example, alkyl substituted morpholine compounds such as N-methyl and N-ethyl morpholine are suitable.

Other suitable organic solvents include ketones such as cyclohexanone, acetone, methyl ethyl ketone, methyl isobutyl ketone and isophorone; esters and ethers such as 2-ethoxyethyl acetate, propylene glycol methyl ether acetates such as DOWANOL® PM ACETATE which is commercially available from Dow Chemical Company; and aromatic solvents such as toluene, xylene, aromatic solvent blends derived from petroleum such as those available under the trademark SOLVESSO®.

Exemplary of a suitable commercially available weldable primer is BONAZINC®, a zinc rich, mill applied, organic, film-forming composition which is commercially available from PPG Industries, Inc.

When in aqueous form, the weldable primer composition pH generally ranges from 7.0 to 12.0, and typically from 8.0 to 10.5. If necessary, water-soluble or water-dispersible acids and/or bases can be used to adjust the pH. Suitable acids include inorganic acids, such as hydrofluoric acid, fluoroboric acid, phosphoric acid, and nitric acid; organic acids, such as lactic acid, acetic acid, hydroxyacetic acid, citric acid; and mixtures thereof. Suitable bases include inorganic bases, such as sodium hydroxide and potassium hydroxide; nitrogen-containing compounds such as ammonia, triethylamine, methyl ethanol amine, diisopropanolamine; and mixtures thereof.

The weldable primer composition can be applied to the surface of an untreated or treated and/or coated metallic substrate by any conventional application technique known in the art, such as by spraying, immersion, or roll coating in a batch or continuous process. Squeegee or wringer rolls can be used to remove excess weldable primer composition. After the weldable primer composition is applied onto a metallic substrate, it typically is thermally cured.

As used herein, by "cured" is meant that any crosslinkable components of the weldable primer are at least partially crosslinked. The crosslink density of the crosslinkable components, i.e., the degree of crosslinking, ranges from 5 percent to 100 percent of complete crosslinking. The crosslink density can be determined by a variety of methods including mechanical thermal analysis (DMTA) techniques.

Curing can be achieved at peak metal temperatures ranging from 100° C. to 400° C. Peak metal temperatures ranging from 130° C. to 260° C. are typical. Suitable cure times (i.e., oven dwell times) can vary widely, and can range from twenty (20) seconds to sixty (60) seconds.

The dry film thickness of the weldable primer layer generally depends on the application conditions. In order to provide sufficient corrosion resistance for a metallic substrate which will be used as an automotive part, the dry film thickness of the weldable primer layer must be at least 1 micrometer (about 0.04 mils), often 1 to 20 micrometers, and typically 2 to 10 micrometers. Depending on the specific chemical makeup of the substrate and the end use of the substrate, it may be necessary to increase or decrease the dry film thickness of the weldable primer layer.

The following Examples are illustrative of the present invention and are not intended to limit the scope of the present invention.

EXAMPLES

The present invention will be further illustrated by the nonlimiting examples below. Table 1 contains compositional data for Examples 1–13 which exemplify various embodiments of the composition having sealing and sound dampening properties according to the present invention. Table 2 contains the results of the Ford Corrosion Test for substrates containing the compositions of Examples 1–11 when the exemplary composition was underbaked ("underbake case"). Table 3 contains the results of the Ford Corrosion Test for substrates containing the compositions of Examples 1–11 when the exemplary composition was overbaked ("overbake case"). Table 4 contains the results of substrates containing the compositions of Examples 12–14 when subjected to the Chrysler Corrosion Test. Examples 12–14 demonstrate the corrosion resistance of the substrates when the inventive composition is applied over a layer of weldable primer. Examples 12-14 were applied over a galvanized panel and over a galvanized panel coated with a layer of weldable primer. Table 5 shows the "under" and "over" bake schedules for different embodiments of the present invention. Table 6 reflects the sound dampening performance of selected exemplary compositions by recording Oberst dissipation data.

In the examples below, Example 2 is a comparative example. Example 2 is sealant/sound dampener which is commercially available from PPG Industries, Inc. under the trade name P7912.

TABLE 1

Compositional Data for Various Embodiments of the Composition Having Sealing and Sound Dampening Performance Properties According to the Present Invention

|  | Ex 1 | Ex 2* | Ex 3 | Ex 4 | Ex 5 | Ex 6 | Ex 7 | Ex 8 | Ex 9 | Ex 10 | Ex 11 | Ex 12 | Ex 13 |
|---|---|---|---|---|---|---|---|---|---|---|---|---|---|
| EPON 828[1] | 20.4 |  | 20.6 | 20.6 | 20.5 | 20.5 | 20.5 | 20.5 | 17.6 | 17.6 | 17.6 | 20.1 | 20.1 |
| Epoxidized Dimer Acid[2] | 2.3 |  | 15.9 | 15.9 | 15.8 | 15.8 | 15.8 | 15.8 | 13.6 | 13.6 | 13.6 |  |  |

TABLE 1-continued

Compositional Data for Various Embodiments of the Composition Having Sealing and Sound Dampening Performance Properties According to the Present Invention

| | Ex 1 | Ex 2* | Ex 3 | Ex 4 | Ex 5 | Ex 6 | Ex 7 | Ex 8 | Ex 9 | Ex 10 | Ex 11 | Ex 12 | Ex 13 |
|---|---|---|---|---|---|---|---|---|---|---|---|---|---|
| ERISYS GE-35[3] | 5.4 | | | | | | | | | | | 15.5 | 15.5 |
| DER736[4] | 1.3 | | | | | | | | | | | | |
| CARDOLITE NC-513[5] | 9.9 | | 4.9 | 4.9 | 4.8 | 4.8 | 4.8 | 4.8 | 6.4 | 6.4 | 6.4 | 3.6 | 3.6 |
| Polyester[6] | 8.0 | | | | | 18.6 | 18.6 | 18.6 | 15.9 | 15.9 | 15.9 | 18.3 | 18.3 |
| Polyester[7] | | | 18.7 | 18.7 | 18.6 | | | | | | | | |
| TRILENE 65[8] | 3.3 | | 2.0 | 2.0 | 2.0 | 2.0 | 2.0 | 4.0 | 1.7 | 1.7 | 1.7 | 1.9 | 1.9 |
| Dicy[9] | 2.5 | | 2.1 | 2.1 | 2.1 | 2.1 | 2.9 | 2.9 | 1.8 | 1.8 | 1.8 | 2.0 | 2.0 |
| Diuron[10] | 1.3 | | 0.6 | 0.6 | 0.6 | 0.6 | 0.9 | 0.9 | 0.5 | 0.5 | 0.5 | 0.6 | 0.6 |
| Mica, C-3000[11] | 36.2 | | 31.7 | 31.7 | 31.4 | 31.4 | 31.4 | 31.4 | 27.0 | 27.0 | 27.0 | 26.2 | 26.2 |
| EPS-200[12] | 3.3 | | | | | | | | | | | | |
| INHIBICIL[13] | 0.5 | | | | | | | | | 0.7 | 0.7 | | |
| K-SPERSE 6501[14] | 0.5 | | | | | | | | | | 0.7 | | |
| WAYCOR 204[15] | | | | 3.0 | | | | | | | | 0.9 | |
| Q-CEL 640[16] | | | 2.0 | 2.0 | 2.0 | 2.0 | 2.0 | 2.0 | | | | | |
| WINNOFIL SPT[17] | | | | | | | | | 6.8 | 6.8 | 6.8 | 7.8 | 7.8 |
| CABOSIL M-5[18] | 1.0 | | | | | | | | 0.8 | 0.8 | 0.8 | 1.0 | 1.0 |
| BENTONE 27[19] | 1.1 | | 1.2 | 1.2 | 2.0 | 2.0 | 2.0 | 2.0 | 2.5 | 2.5 | 2.5 | 1.9 | 1.9 |
| BENTONE 38[20] | 2.5 | | | | | | | | | | | | |
| TALC 40-27[21] | | | | | | | | | 5.1 | 5.1 | 5.1 | | |
| RAVEN 410[22] | 0.1 | | 0.3 | 0.3 | 0.3 | 0.3 | 0.3 | 0.3 | 0.3 | 0.3 | 0.3 | 0.3 | 0.3 |
| CaO[23] | 0.4 | | | | | | | | | | | | |

[1]Diglycidyl either of Bisphenol A which is commercially available from Resolution Performance Products.
[2]A material comprising 26.95 weight percent EMPOL 1022 which is a dimer acid sold by Cognis Emery Grp., .06 weight percent triphenyl phosphine, and 72.99 weight percent EPON 880. It has an acid number below 0.2 and an epoxy equivalent between 330 and 370
[3]Castor oil glycidyl ether which is commercially available from CVC Specialties.
[4]Diepoxyide of polypropylene glycol which is commercially available from Dow Corporation.
[5]Aliphatic/aromatic monoepoxide which is commercially available from Cardolite Corporation.
[6]Dipropylene glycol adipate polyester. This polyester comprises 60.6 weight percent of adipic acid, 39.4 weight percent of propylene glycol, and 0.1 weight percent butyl stannoic acid. It has a number average molecular weight ranging from 1,000 to 5,000, an acid value less than 10, and a hydroxyl value of approximately 110.
[7]Diethylene glycol adipate polyester. This polyester comprise 45.4 weight percent adipic acid and 54.6 weight percent of diethylene glycol. It has a number average molecular weight ranging from 1,000 to 5,000, an acid value less than 10, and a hydroxyl value of approximately 110.
[8]Ethylene propylene diene terpolymer which is commercially available from Uniroyal Chemical.
[9]Dicyandiamide, which is commercially available from Air Products as Amicure CG-325.
[10]3-(3,4-dichlorophenyl)-1,1-dimethylurea which is commercially available from Degussa as Dyhard UR 200.
[11]Commercially available from Oglebay Norton Specialty Minerals.
[12]Ground rubber tire which is commercially available from Environmental Processing Systems.
[13]Ca modified, precipitated silica.
[14]Zinc salt of alkyl naphthalene sulfonic acid which is commercially available from King Industries.
[15]Calcium phosphate commercially available from Wayncor Ind.
[16]Hollow polypropylene beads which are commercially available from PQ Corp.
[17]Stearic acid coated $CACO_3$ which is commercially available from Solvay & Cie.
[18]Fumed silica which is commercially available Cabot Corp.
[19]Bentone clay which is commercially available from Elements Specialties.
[20]Bentone clay which is commercially available from Elements Specialties.
[21]Commercially available from Whitaker, Clark & Daniels.
[22]Carbon black which is commercially available from Phelps Dodge Columbian Chemicals.
[23]Calcium oxide which is commercially available from Mississippi Lime.
*Comparative example.

Tables 2 and 3 show the results of substrates containing various embodiments of the inventive composition when subjected to the Ford Corrosion Test[1]. Table 2 shows the underbake case, and Table 3 shows the overbake case. See Table 5 for the "under" and "over" bake schedules.

TABLE 2

RESULTS OF THE FORD CORROSION TEST - UNDERBAKE CASE

| | Examples | | | | | | | | | | |
|---|---|---|---|---|---|---|---|---|---|---|---|
| | 1 | 2* | 3 | 4 | 5 | 6 | 7 | 8 | 9 | 10 | 11 |
| Predominant Failure Mode | | adh[2] | coh[4] | tcf[5] | coh | coh | coh | coh | tfc (easy to fit) | coh/tfc (slight lift) | coh (1–2 mm from edge; adh |
| Blisters due to exposure | | None | None | None | None | None | None | Slight | | | |
| Undercutting from the edge (mm)-4" wide-intrusion into the | | Complete release from substrate[3] | 30 | 5–7 | 20–25 | 3–5 | 4–8 | 2–3 | | | |

TABLE 2-continued

RESULTS OF THE FORD CORROSION TEST - UNDERBAKE CASE

| | \multicolumn{11}{c}{Examples} | | | | | | | | | | |
|---|---|---|---|---|---|---|---|---|---|---|---|
| | 1 | 2* | 3 | 4 | 5 | 6 | 7 | 8 | 9 | 10 | 11 |
| coating along with short side of a 4" × 12' panel | | | | | | | | | | | |
| Undercutting from the edge (mm)-12" wide-intrusion into the coating along the long side of a 4" × 12' panel | | Complete release from substrate | 10–15 | 5–7 | 10–15 | 3–8 | 5–10 | 2–3 | No corrosion | No corrosion | No corrosion |
| Undercutting from the corner (mm)-intrusion into the coating at the corner of the panel | | Complete release from substrate[2] | 40 | 10 | 25–30 | 7–10 | 3–8 | 2–5 | | | |
| Color of the Undercut Metal | | gray-brown | white, gray, brown | gray, dark gray | gray, brown | brown, gray | gray, brown | gray, brown | | | |

[1] the Ford Corrosion Test is described in WSS-M99P30-A Section 3.6, FLTM B1 123-0. The Ford Corrosion Test includes soaking the substrate in a salt solution for 15 minutes, drying the substrate for 1.5 hours, followed by another 22 hours of drying at 90% relative humidity and 50° C. The Ford Corrosion Test was conducted 5 days per week over a 10 week period.
[2] adhesive failure-when the coating is peeled away with a knife, no coating remained on the substrate.
[3] complete release-when the coating is peeled away with a knife, the coating lifts easily in one piece and the substrate does not contain any coating.
[4] cohesive failure-when the coating is peeled away with a knife, some coating peels away and some is left on the substrate; the coating layer fails in the middle.
[5] thin film adhesive failure-when the coating is peeled away with a knife, a thin film of the containing remains on the surface of the substrate.
*Comparative example

TABLE 3

RESULTS OF THE FORD CORROSION TEST - OVERBAKE CASE

| | \multicolumn{11}{c}{Examples} | | | | | | | | | | |
|---|---|---|---|---|---|---|---|---|---|---|---|
| | 1 | 2* | 3 | 4 | 5 | 6 | 7 | 8 | 9 | 10 | 11 |
| Predominant Failure Mode | | adh | coh | tfc | coh | coh | coh | coh | coh (2–3 mm from edge adh) | coh (1–2 mm from edge adh) | coh (1–2 mm from edge adh) |
| Blisters due to exposure | | severe | none | none | none | none | severe | slight | | | |
| Undercutting from the edge (mm)-4" wide | | 10–40 | 10–12 | 5–7 | 5–7 | 3–5 | 2–5 | 2–4 | | | |
| Undercutting from the edge (mm)-12" | | 10–15 | 8–10 | 5 | 5–7 | 0–2 | 0–2 | 2–4 | No corrosion | No corrosion | No corrosion |
| Undercutting from the corner (mm) | | 10–15 | 15–20 | 5 | 5–8 | 5–8 | 3–5 | 2–4 | | | |
| Color of the Undercut Metal | | gray | white and gray | gray, dark gray | brown, gray | gray, brown | gray, brown | gray, brown | | | |

*Comparative example.

TABLE 4

RESULTS OF THE CHRYSLER CORROSION TEST[1]

| | Examples | | |
|---|---|---|---|
| | 12 | 13 | 2* |
| COATING APPLIED OVER A GALVANIZED METAL PANEL | | | |
| Corrosion | none | none | none |
| Undercutting (mm) | 3–4 | 3–4 | almost total |
| COATING APPLIED OVER A GALVANIZED PANEL COATED WITH A WELDABLE PRIMER (BONAZINC) WHICH IS COMMERCIALLY AVAILABLE FROM PPG | | | |
| Corrosion | none | none | none |
| Undercutting (mm) | none | none | none |

[1] The Chrysler Test is defined as Test method LP-463PB-10-01.
*Comparative example.

TABLE 5

UNDERBAKE AND OVERBAKE SCHEDULES FOR THE EXEMPLARY COMPOSITIONS

| Example | Underbake Schedule | Overbake Schedule |
|---|---|---|
| 1 | 60 minutes at 335° F. followed by 20 minutes at 330° F. | 60 minutes at 375° F. followed by 30 minutes at 250° F. |

TABLE 5-continued

UNDERBAKE AND OVERBAKE SCHEDULES
FOR THE EXEMPLARY COMPOSITIONS

| Example | Underbake Schedule | Overbake Schedule |
|---|---|---|
| 2* | 60 minutes at 335° F. followed by 20 minutes at 330° F. | 60 minutes at 375° F. followed by 30 minutes at 250° F. |
| 4 | 30 minutes at 325° F. | 60 minutes at 400° F. |
| 5 | 30 minutes at 325° F. | 60 minutes at 400° F. |
| 8 | 30 minutes at 325° F. | 60 minutes at 380° F. |
| 11 | 30 minutes at 325° F. | 60 minutes at 380° F. |
| 12 | 30 minutes at 325° F. | 60 minutes at 380° F. |
| 13 | 30 minutes at 325° F. | 60 minutes at 380° F. |

*Comparative example.

TABLE 6

Oberst Dissipation Data[1] for Selected Examples

| Example | Oberst Dissipation Factor Underbake Case | Oberst Dissipation Factor Overbake Case |
|---|---|---|
| 1 | 0.09 | 0.09 |
| 2* | 0.13 | 0.10 |
| 4 | 0.15 | 0.10 |
| 5 | 0.13 | 0.08 |
| 8 | 0.14 | 0.07 |
| 11 | 0.11 | 0.04 |
| 12 | 0.11 | 0.07 |
| 13 | 0.11 | 0.09 |

[1]The Oberst dissipation factor was measured at 200 Hz and 25° C. in accordance with ASTM E-756-98.
*Comparative example.

As can be seen from the experimental results above, the compositions of the present invention provide superior sealing and sound dampening properties. When the composition of the present invention was applied over a metallic substrate coated with a weldable primer, there was little or no corrosion and no undercutting. Depending on the desired end-use of the automotive part or other substrate onto which the inventive composition is applied, the specific formulation of the inventive composition can vary.

Whereas particular embodiments of this invention have been described above for purposes of illustration, it will be evident to those skilled in the art the numerous variations of the details of the present invention may be made without departing from the invention as defined in the appended claims.

What is claimed is:

1. multilayer composite comprising a weldable primer layer formed from a weldable primer composition, and a second layer having improved sealing and sound dampening properties formed from a second composition over at least a portion of the weldable primer layer, the second composition comprising:

(a) one or more polyepoxides comprising at least two epoxide groups per molecule;

(b) a thermoplastic polyester polymer;

(c) a curing agent having functional groups reactive with the functional groups of the polyepoxide (a);

(d) inorganic particles having an oil absorption value of less than 70 as determined in accordance with ASTM D 281-95; and (e) inorganic microparticles different from the inorganic particle (d), the inorganic microparticles having an average particle size prior to incorporation into the composition ranging from 0.5 to 200 microns.

2. The multilayer composite according to claim 1, wherein the weldable primer layer is formed from a weldable primer composition comprising:

(A) a resinous binder comprising:
(1) at least one functional group-containing polymer, and
(2) at least one curing agent having functional groups reactive with the functional groups of (1); and (B) at least one electroconductive pigment dispersed in resinous binder (A).

* * * * *